US008559314B2

(12) United States Patent
Yedavalli et al.

(10) Patent No.: US 8,559,314 B2
(45) Date of Patent: Oct. 15, 2013

(54) IMPLEMENTING OSPF IN SPLIT-ARCHITECTURE NETWORKS

(75) Inventors: Kiran Yedavalli, San Jose, CA (US); Neda Beheshti-Zavareh, San Jose, CA (US); Ying Zhang, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 144 days.

(21) Appl. No.: 13/208,251

(22) Filed: Aug. 11, 2011

(65) Prior Publication Data

US 2013/0039214 A1 Feb. 14, 2013

(51) Int. Cl.
*H04L 1/00* (2006.01)

(52) U.S. Cl.
USPC ............ 370/238; 370/255; 709/241; 709/242

(58) Field of Classification Search
USPC .......... 370/229–235, 237, 254–256; 455/445; 709/238, 241
See application file for complete search history.

(56) References Cited

U.S. PATENT DOCUMENTS

| 2006/0092940 | A1* | 5/2006 | Ansari et al. | 370/392 |
| 2012/0144066 | A1* | 6/2012 | Medved et al. | 709/242 |

OTHER PUBLICATIONS

N. McKeown, et al., "Open Flow: Enabling Innovation in Campus Networks", www.openflowswitch.org, Mar. 14, 2008, 6 pages.
OpenFlow Switch Specification V1.1, http://openflow.org/documents/openflow1.1-allmerged-draft2.pdf, Feb. 28, 2011, 56 pages.
J. Moy, "OSPF Version 2", RFC 2328, Network Working Group, Apr. 1998, 204 pages.
Open Shortest Path; http://en.wikipedia.org/wiki/Open_Shortest_Path_First; 14 pages, Retrieved in 2011.

\* cited by examiner

*Primary Examiner* — Pao Sinkantarakorn
(74) *Attorney, Agent, or Firm* — Blakely, Sokoloff, Taylor & Zafman

(57) ABSTRACT

A method is implemented in a network element that functions as one of a plurality of controllers for one of a plurality of areas of a split architecture network. The controller provides a control plane for the area of the split architecture network where the controller is remote from a plurality of switches providing a data plane for the area of split architecture network. The controller facilitates optimized routing across the plurality of areas of the split architecture network by providing limited intra-area link cost data to other controllers of other areas of the split architecture network and to traditional routers of a network including the split architecture network. The limited intra-area link cost data provides costs of each possible shortest path traversal of the area of the controller without providing all internal link cost data.

16 Claims, 14 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Version #   |     Type      |         Packet length         |
+-+-+-+-+-+-+-+-+-+-+-+-+-+-+-+-+-+-+-+-+-+-+-+-+-+-+-+-+-+-+-+-+
|                          Router ID                            |
+-+-+-+-+-+-+-+-+-+-+-+-+-+-+-+-+-+-+-+-+-+-+-+-+-+-+-+-+-+-+-+-+
|                           Area ID                             |
+-+-+-+-+-+-+-+-+-+-+-+-+-+-+-+-+-+-+-+-+-+-+-+-+-+-+-+-+-+-+-+-+
|           Checksum            |             AuType            |
+-+-+-+-+-+-+-+-+-+-+-+-+-+-+-+-+-+-+-+-+-+-+-+-+-+-+-+-+-+-+-+-+
|                       Authentication                          |
+-+-+-+-+-+-+-+-+-+-+-+-+-+-+-+-+-+-+-+-+-+-+-+-+-+-+-+-+-+-+-+-+
|                       Authentication                          |
+-+-+-+-+-+-+-+-+-+-+-+-+-+-+-+-+-+-+-+-+-+-+-+-+-+-+-+-+-+-+-+-+
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Version #   |     Type      |         Packet length         |
+-+-+-+-+-+-+-+-+-+-+-+-+-+-+-+-+-+-+-+-+-+-+-+-+-+-+-+-+-+-+-+-+
|                          Router ID                            |
+-+-+-+-+-+-+-+-+-+-+-+-+-+-+-+-+-+-+-+-+-+-+-+-+-+-+-+-+-+-+-+-+
|                           Area ID                             |
+-+-+-+-+-+-+-+-+-+-+-+-+-+-+-+-+-+-+-+-+-+-+-+-+-+-+-+-+-+-+-+-+
|           Checksum            |             AuType            |
+-+-+-+-+-+-+-+-+-+-+-+-+-+-+-+-+-+-+-+-+-+-+-+-+-+-+-+-+-+-+-+-+
|                        Authentication                         |
+-+-+-+-+-+-+-+-+-+-+-+-+-+-+-+-+-+-+-+-+-+-+-+-+-+-+-+-+-+-+-+-+
|                        Authentication                         |
+-+-+-+-+-+-+-+-+-+-+-+-+-+-+-+-+-+-+-+-+-+-+-+-+-+-+-+-+-+-+-+-+
|                         Network Mask                          |
+-+-+-+-+-+-+-+-+-+-+-+-+-+-+-+-+-+-+-+-+-+-+-+-+-+-+-+-+-+-+-+-+
|         HelloInterval         |    Options    |    Rtr Pri    |
+-+-+-+-+-+-+-+-+-+-+-+-+-+-+-+-+-+-+-+-+-+-+-+-+-+-+-+-+-+-+-+-+
|                       RouterDeadInterval                      |
+-+-+-+-+-+-+-+-+-+-+-+-+-+-+-+-+-+-+-+-+-+-+-+-+-+-+-+-+-+-+-+-+
|                       Designated Router                       |
+-+-+-+-+-+-+-+-+-+-+-+-+-+-+-+-+-+-+-+-+-+-+-+-+-+-+-+-+-+-+-+-+
|                    Backup Designated Router                   |
+-+-+-+-+-+-+-+-+-+-+-+-+-+-+-+-+-+-+-+-+-+-+-+-+-+-+-+-+-+-+-+-+
|                            Neighbor                           |
+-+-+-+-+-+-+-+-+-+-+-+-+-+-+-+-+-+-+-+-+-+-+-+-+-+-+-+-+-+-+-+-+
|                              ...                              |
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age             |    Options    |    LS type    |
+-+-+-+-+-+-+-+-+-+-+-+-+-+-+-+-+-+-+-+-+-+-+-+-+-+-+-+-+-+-+-+-+
|                        Link State ID                          |
+-+-+-+-+-+-+-+-+-+-+-+-+-+-+-+-+-+-+-+-+-+-+-+-+-+-+-+-+-+-+-+-+
|                       Advertising Router                      |
+-+-+-+-+-+-+-+-+-+-+-+-+-+-+-+-+-+-+-+-+-+-+-+-+-+-+-+-+-+-+-+-+
|                       LS sequence number                      |
+-+-+-+-+-+-+-+-+-+-+-+-+-+-+-+-+-+-+-+-+-+-+-+-+-+-+-+-+-+-+-+-+
|         LS checksum           |             length            |
+-+-+-+-+-+-+-+-+-+-+-+-+-+-+-+-+-+-+-+-+-+-+-+-+-+-+-+-+-+-+-+-+
```

FIG. 4

| Bit/Byte | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | LS Age |||||||||||||||| LS Type ||||||||||||||||
| 32 | Link State ID ||||||||||||||||||||||||||||||||
| 64 | Advertising Router ||||||||||||||||||||||||||||||||
| 96 | LS Sequence Number ||||||||||||||||||||||||||||||||
| 128 | LS Checksum |||||||||||||||| Length ||||||||||||||||
| 160 | Depending on the "LS Type" details of the contents will vary. ||||||||||||||||||||||||||||||||
| 192 | ... ||||||||||||||||||||||||||||||||

FIG. 11

| Bit/Byte | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | LS Age |||||||||||||||| 0 | 0 | 1 |||||||||||||| 1 |
| 32 | Link State ID ||||||||||||||||||||||||||||||||
| 64 | Self Switch ID ||||||||||||||||||||||||||||||||
| 96 | LS Sequence Number ||||||||||||||||||||||||||||||||
| 128 | LS Checksum |||||||||||||||| Length ||||||||||||||||
| 160 | 0 ||| Nt | x | V | E | B ||||||||| Options ||||||||||||||||
| 192 | Type |||||||| 0 |||||||| Metric ||||||||||||||||
| 224 | Self Interface ID ||||||||||||||||||||||||||||||||
| 256 | Neighbor Interface ID ||||||||||||||||||||||||||||||||
| 288 | Neighbor Switch ID ||||||||||||||||||||||||||||||||
| 320 | ... ||||||||||||||||||||||||||||||||
| . | Type |||||||| 0 |||||||| Metric ||||||||||||||||
| . | Interface ID ||||||||||||||||||||||||||||||||
| . | Neighbor Interface ID ||||||||||||||||||||||||||||||||
| . | Neighbor Router ID ||||||||||||||||||||||||||||||||
| . | ... ||||||||||||||||||||||||||||||||

FIG. 12

IMPLEMENTING OSPF IN SPLIT-ARCHITECTURE NETWORKS

FIELD OF THE INVENTION

The embodiments of the invention are related to the path finding or routing in split architecture networks. Specifically, the embodiments of the invention relate to a method and system for implementing an open shortest path first process for routing data in networks including a split architecture network and traditional routers.

BACKGROUND

A split-architecture network design introduces a separation between the control and forwarding components of the network, also referred to as the control plane and the forwarding or data plane. Split architecture networks can be utilized in an access/aggregation domain of a carrier-grade network, a mobile backhaul, cloud computing, and multilayer (L3 & L2 & L1, optical transport network (OTN), wavelength division multiplexing (WDM)) support, all of which are among the building blocks of the network architecture.

Unlike the traditional network architecture, which integrates both forwarding (data) and control planes in the same box, split architecture decouples these two functions and runs the control plane on servers (controllers) that might be in different physical locations from the forwarding elements (switches). The split architecture simplifies the functions and hardware of the forwarding platform and concentrates the network's intelligence and management into a set of controllers that oversee the switches. The tight coupling of forwarding and control planes in the traditional network architecture usually results in a highly complicated control plane and complex network management. This makes creation of new networking devices expensive and creates a high barrier to entry for new protocols and technology for potential deployment in these devices. Despite the rapid improvement on line speeds, port densities, and performance, the network control plane mechanisms for managing these features have advanced at a much slower pace.

In a split architecture network, controllers collect information from switches, and compute and distribute the appropriate forwarding decisions to switches. Controllers and switches use a control plane protocol to communicate and exchange information. An example of such protocol is OpenFlow, which provides an open and standard method for a switch to communicate with a controller. FIG. 1 is a diagram of an overview of the OpenFlow interface between a switch and a controller. The OpenFlow controller communicates with the OpenFlow switch using a secure channel to configure a forwarding table (flow table).

The forwarding table in an OpenFlow switch is populated with entries consisting of: rules defining matches for fields in packet headers; actions to be executed upon detecting a match defined by a rule; and a collection of statistics on the processing of data packets in the data plane. When an incoming data packet matches a particular rule, the associated actions are performed on the data packet. A rule contains key fields from several headers in the protocol stack, for example Ethernet MAC addresses, IP address, IP protocol, TCP/UDP port numbers as well as the incoming port number. A set of data packets having similar characteristics can be managed as a flow. A flow can be defined using any number or combination of the available fields in a data packet. It is also possible to restrict the rules to match on a subset of the available fields by using wildcards for the unwanted fields.

The de-coupling of the control plane and data plane of the split architecture eases the task of modifying the network control logic and provides a programmatic interface upon which developers can build a wide variety of new protocols and management applications. In this model, the data and control planes can evolve and scale independently, while the cost of the data plane elements is reduced.

SUMMARY

A method is described that is implemented in a network element functioning as one of a plurality of controllers for one of a plurality of areas of a split architecture network. The controller provides a control plane for the area of the split architecture network where the controller is remote from a plurality of switches providing a data plane for the area of split architecture network. The controller facilitates optimized routing across the plurality of areas of the split architecture network by providing limited intra-area link cost data to other controllers of other areas of the split architecture network and to traditional routers of a network including the split architecture network. The limited intra-area link cost data provides costs for each possible shortest path traversal of the area of the controller without providing all internal link cost data. The method comprises the steps that follow including learning a topology of the area of the controller in the split architecture network including each border switch in the area of the controller, wherein each border switch in the area of the controller has at least one external port linking the area of the controller to another area of the split architecture network or to one of the traditional routers in the network. The steps include computing a shortest path between each border switch pair in the area of the controller. The steps include storing a cost of each shortest path between each border switch pair in a routing table of the controller. The steps include identifying each neighbor controller in the split architecture network or neighbor traditional router in the network using a hello protocol, wherein each neighbor controller controls switches in another area of the split architecture network accessible through at least one external port of the area of the controller. The steps include exchanging a link state database with each neighbor controller, the link state database including the cost of each shortest path between each border switch pair. The steps include calculating a shortest path tree for the network with the controller as a root of the tree and updating forwarding tables in switches of the area of the controller to implement forwarding according to the shortest path tree.

A network element functions as one of a plurality of controllers for one of a plurality of areas of a split architecture network. The controller provides a control plane for the area of the split architecture network where the controller is remote from a plurality of switches providing a data plane for the area of the split architecture network. The controller facilitates optimized routing across the plurality of areas of the split architecture network by providing limited intra-area link cost data to other controllers of other areas of the split architecture network and to traditional routers of a network including the split architecture network. The limited intra-area link cost data provides costs of each possible shortest path traversal of the area of the controller without providing all internal link cost data. The network element comprises an ingress module configured to receive data over a network and an egress module configured to transmit data over the network. The network element also includes a network processor coupled to the ingress module and egress module, the network processor configured to execute a set of modules comprising a controller module, a topology learning module, a shortest path calculation module, a neighbor discovery module and a link state management module. The topology learning module is configured to determine a topology of the area of the controller in the split architecture network including each border switch in the area of the controller, wherein each border switch has at least one external port linking the area of the controller to another area of network or a traditional router in the network. The controller module is configured to provide control plane functionality for the area of the controller in the split architecture network. The shortest path calculation module is configured to identify a shortest path between each border switch in the area of the controller to be shared with neighbor controllers and the traditional routers and to calculate a shortest path tree for the network with the controller as the root of the tree. The neighbor discovery module is configured to identify each neighbor controller in the split architecture network using a hello protocol, and the link state management module is configured to exchange a link state database with each neighbor controller. The link state database includes a cost of each shortest route between each border switch pair in the area of the controller and a routing table storage device communicatively coupled to the network processor. The routing table storage device is configured to store routing tables for the controller module including shortest path information for the area of the controller and between border switches of the area of the controller.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 2 is diagram of an open shortest path first (OSPF) packet header.

FIG. 3 is a diagram of an OSPF hello packet.

FIG. 4 is a diagram of a link state advertisement (LSA) header format.

FIG. 11 is a diagram of an OSPF link state advertisement header format.

FIG. 12 is a diagram of a router LSA message.

DETAILED DESCRIPTION

Figure 1:
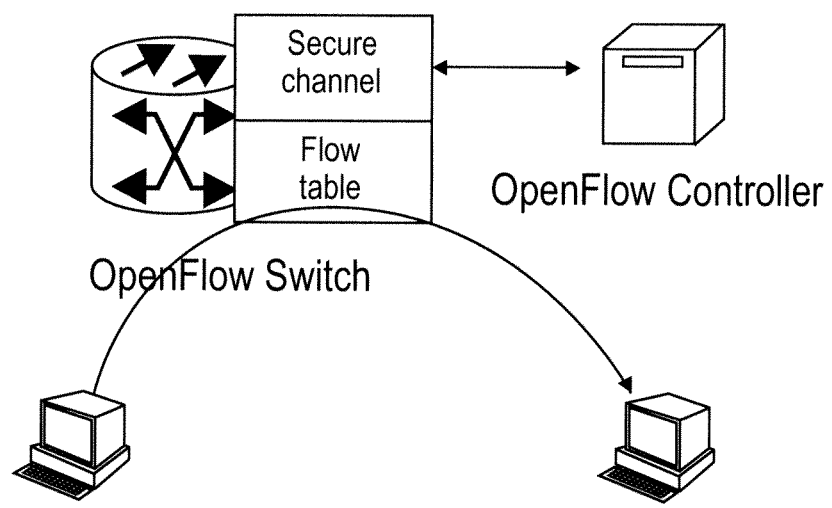
FIG. 1 is a diagram of one embodiment of an example architecture for a simple OpenFlow network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 7-9 and 14. However, it should be understood that the operations of the flow diagram in FIGS. 10 can be performed by embodiments of the invention other than those discussed with reference to FIGS. 7-9 and 14 and the embodiments discussed with reference to FIGS. 7-9 and 14 can perform operations different than those discussed with reference to the flow diagram of FIG. 10.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

Split-Architecture Areas

A single access/aggregation network can be made up of multiple distinct split-architecture areas working in tandem with multiple traditional routers. As used herein, a split-architecture area is a section of a split architecture network with separate routing similar to a domain. This can be done to simplify administration over a wide geographical area, for network robustness or for control-plane scalability. Each split architecture area can be administered by a separate controller. Depending on the specific application, controllers of these distinct split-architecture areas need to share and exchange some information for proper administration of the split architecture network.

Open Shortest Path First Routing

Both traditional networks and split architecture networks must calculate routes between the switches and other devices serviced by the network. The Open Shortest Path First (OSPF) is an interior gateway routing protocol. OSPF (defined in RFC 2328) is a link-state protocol in which a router broadcasts its neighbors' link-state information to all the nodes in the routing domain. Using this information every router constructs the topology map of the entire network in the domain. Each router maintains a link-state database which reflects the entire network topology. Based on this topology map and the link cost metrics the routers determine the shortest paths to all other routers using Dijkstra's algorithm. This information is in turn used to create routing tables that are used for forwarding of Internet Protocol (IP) packets.

OSPF enables dividing a routing domain into multiple "areas" that are separated by Area Border Routers (ABRs) for ease of administration. Each area is identified by a 32 bit identifier, usually the IP address of the main router in the area, with identifier "0" reserved for the core or backbone of an OSPF network. The broadcast of link state information is limited to the area and not sent beyond the area. In the OSPF process, each router (switch) runs a separate copy of the OSPF protocol process for each area it belongs to. If a router has multiple interfaces that belong to different areas, it runs multiple copies of the process, one for each interface. Upon boot-up, the OSPF process of a router initializes all the routing protocol data structures and obtains information about that router's active interfaces from lower layers. The router then uses OSPF's Hello protocol packets to detect its neighbors. A router transmits Hello packets to its neighbors and receives Hello packets from its neighbors. On broadcast and point-to-point networks, the hello packets are sent out on multicast address 224.0.0.5. On non-broadcast networks, user configuration is required to discover neighbors. On broadcast and non-broadcast multiple access networks (NBMA), the Hello protocol is used to elect a "Designated Router" and a "Backup Designated Router" for the segment of the network.

Upon detection of neighbors, the router will try to establish "adjacencies" with its newly detected neighbors. The adjacencies determine the distribution of routing information within the area. Routing updates are transmitted and received only on adjacencies. Upon establishment of an adjacency, the router will synchronize its "link-state database" with the corresponding router on the other end of the adjacency. For broadcast and NBMA networks, the Designated Router determines which routers become adjacent.

Routers periodically advertise their state, also referred to as the "link-state," using the Link State Advertisements (LSA). The link-state is also advertised when a router's state changes. The LSA contains the adjacencies of the advertising router. A router floods its LSAs through-out the area. The flooding algorithm ensures reliability of information to make sure that all routers in the area have the same exact link-state database. The link-state database consists of the collection of LSAs originated by each router belonging to the area.

Each router uses this database to calculate the shortest path tree with itself as the root. The shortest path tree is in turn used to create the router's routing table. OSPF messages are transmitted directly encapsulated in IP packets with protocol number 89, without the use of transport layer protocols such as TCP or UDP. Additionally OSPF uses its own error detection and correction.

OSPF defines five different packet types. A Hello Packet: OSPF's Hello Protocol packets are used to discover and maintain neighbor relationships. A Database Description Packet: These packets are used for formation of adjacencies. A Link State Request Packet: These packets are used for downloading link-state databases between adjacent routers. A Link State Update Packet: These packets are used for OSPF's reliable update mechanism. A single Link State Update packet could contain LSAs of several routers. Link State Ack packet: These packets are used in conjunction with the Link State Update Packet for OSPF's reliable update mechanism. OSPF protocol packets (except the Hello packets) are sent only over adjacencies. Thus all OSPF protocol packets travel a single Internet Protocol (IP) hop, with the IP address of one router as the source address and the IP address of the other router as the destination address.

Figure 5:
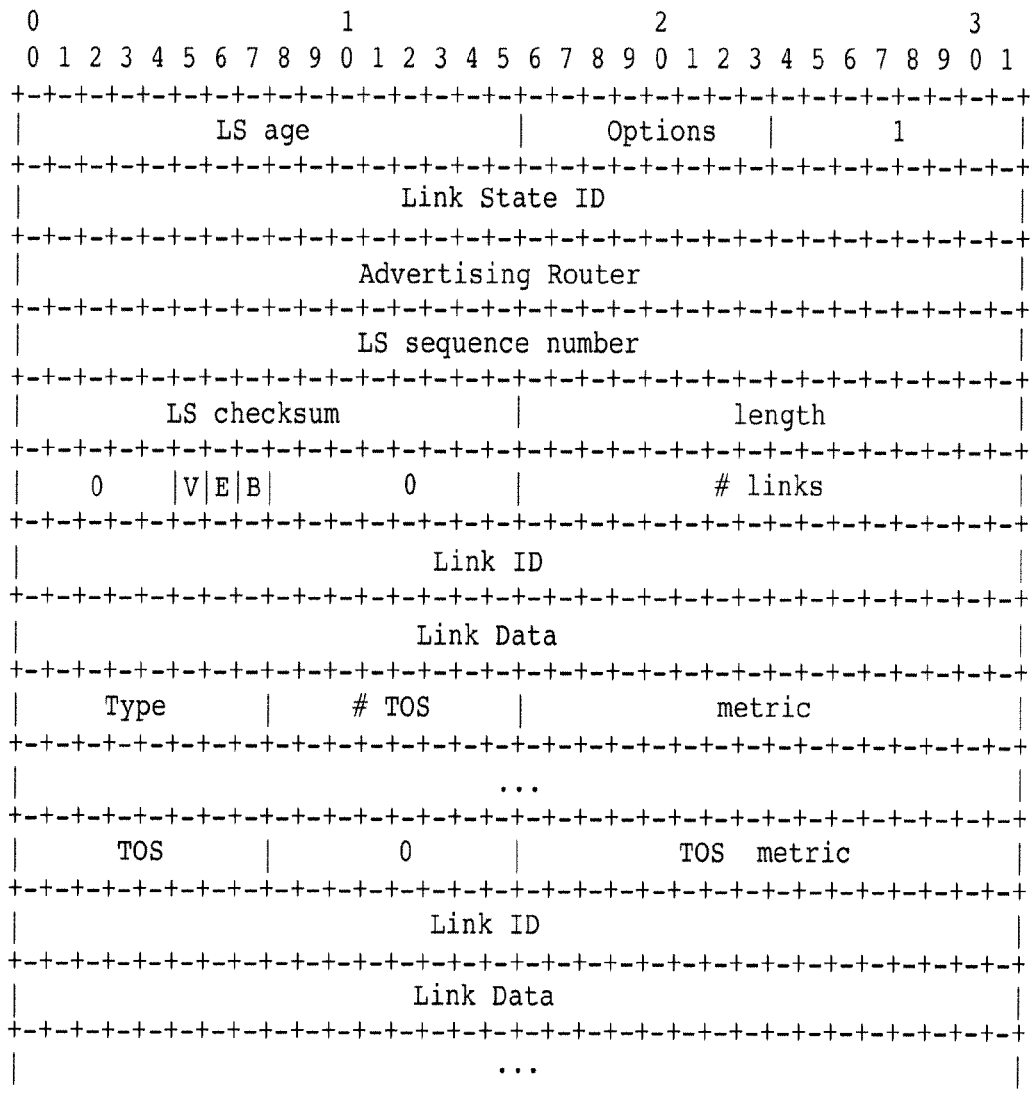
FIG. 5 is a diagram of a router-LSA message.

The OSPF defined in RFC 2328 specifies 5 different types of LSAs. Router-LSA: These LSAs are sent by all the routers in an area. Each LSA contains the states of the router's interfaces to an area. The Router-LSAs are flooded throughout a single area only. Network-LSA: These LSAs are originated by the Designated Router for a broadcast or NBMA network. This LSA contains the list of routers connected to the network. Like the Router-LSA, this LSA is also flooded throughout a single area only. Network Summary LSA: This LSA is originated by the area border router (ABR) and each LSA describes a route to a destination network outside the area, but still inside the Autonomous System (AS). Boundary Summary LSA: Like the Network Summary LSA, this LSA is originated by the border area router (ABR) and it describes routes to AS boundary routers. AS-external-LSA: This LSA is originated by AS boundary routers, and they are flooded throughout the AS. Each of these LSAs describes a route to a destination in another AS. The OSPF Packet Header format is as shown in FIG. 2. The Hello Packet format is shown in FIG. 3. The LSA Header format is as shown in FIG. 4. The Router LSA Packet format is as shown in FIG. 5.

OSPF in a Split-Architecture Network

In a split architecture network, routing messages, like all other control messages, are exchanged between the controllers. One simple way to implement OSPF in the split architecture is to ignore the internal costs and only exchange information about external costs—i.e., the costs of links connecting different network areas. By doing so, the traditional OSPF messages can be exchanged between controllers, and each Split Architecture area can be considered as a single node.

Figure 6:
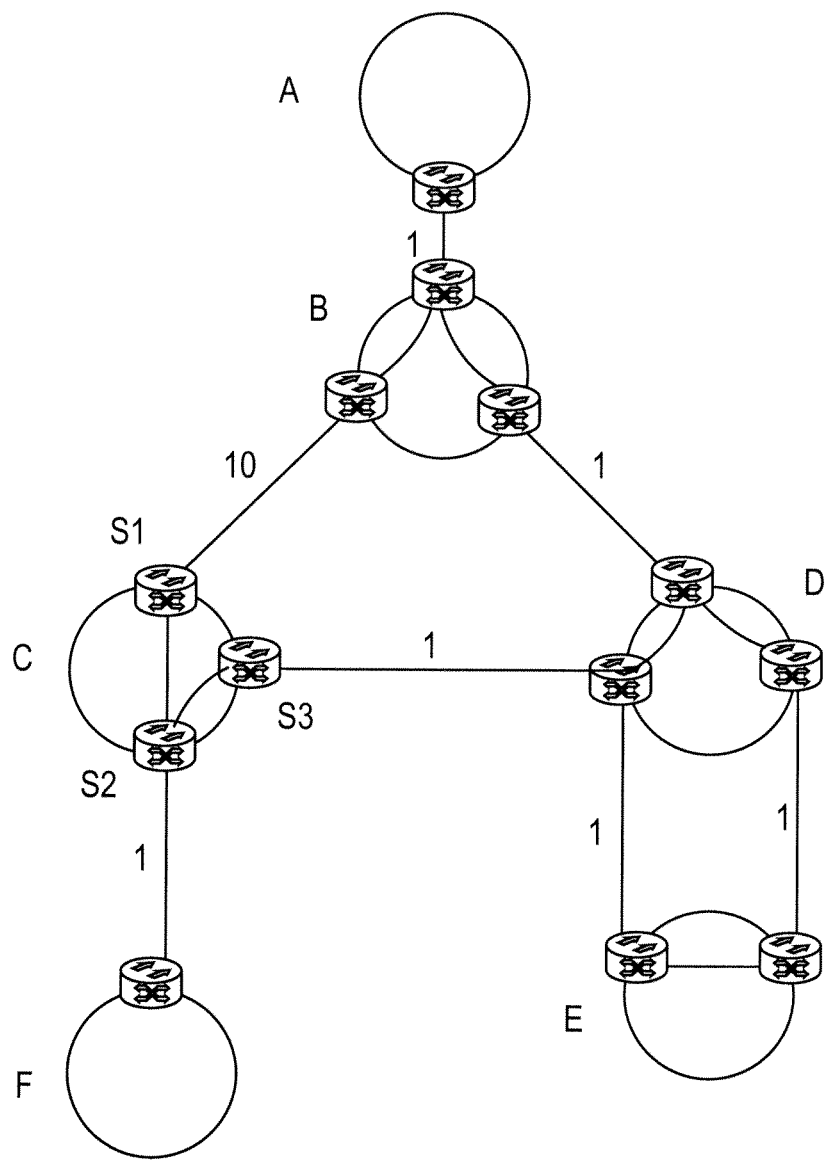
FIG. 6 is a diagram of an example network where OSPF external link cost information is exchanged.

In the network depicted in FIG. 6, for example, controller B announces that it has a link to area C with cost of 10 units. However, the routes found based on this information are sub-optimal. In this implementation because the internal costs are not provided to other controllers, the controllers will not be able to make decisions based on actual end-to-end costs. This results in sub-optimal routes when internal costs within one area vary considerably from one internal path to another.

In an alternate embodiment, the above problem of sub-optimal routes can be fixed by including the internal costs in the information exchanged between controllers. Each controller can calculate the internal-link costs and find the shortest path (i.e., the least-expensive path) between any two of its border switches. For example, referring again to FIG. 6, when controller C announces the link cost between its own area and controller F's area, it adds the shortest-path cost between border switches S1 and S2, and adds that to the cost information sent to controller B. Similarly, Controller C adds the shortest-path cost between switches S2 and S3 to the cost between areas C and F, and sends this information to controller D.

This alternate embodiment also creates problems. This embodiment requires sending multiple (and possibly different) link cost messages for the same link. For example, the cost announced by controller C to reach area F is different when this information is sent to controller B versus when it is sent to controller D, because they are each based on a different internal-path cost (e.g., if the internal shortest-path cost between S1 and S2 is different from the cost between S2 and S3, then controller C will announce two different link costs between its own area and controller F's area). Eventually, these two contradicting messages will be received by other controllers, which will interpret the second message as an update on the first received message, rather than interpreting them as two separate messages.

Further embodiments that attempt to fix this multiple-cost problem, for example by modifying the OSPF protocol to allow attributing multiple costs to the same link, the shortest path found by the controllers in the split architecture might not be the optimal one. For example, in the scenario depicted in FIG. 7, where the numbers on each link show the costs of the links in either direction, sub-optimal routes would be determined. In calculating the shortest path from area A to area F, the following steps will be taken: (1) C announces to B and D: cost 2 (1+1) to reach F; (2) B announces to A: cost 11 (10+1) to reach C; (3) D announces to B: cost 21 (1+20) to reach C (note that there is only one internal path between border switches S4 and S5 within area D); and (4) B announces to A: cost 2 (1+1) to reach C.

Figure 7:
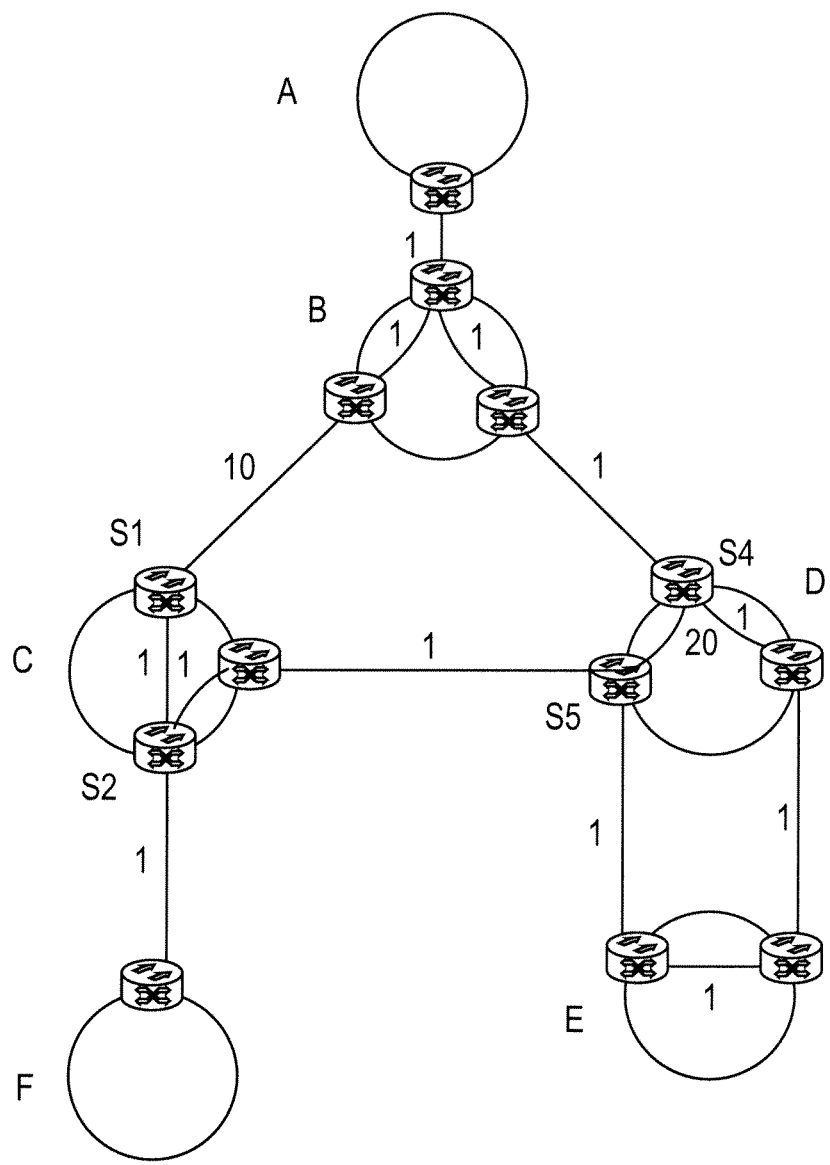
FIG. 7 is a diagram of an example network where OSPF internal link cost information is exchanged.

When controller A calculates its shortest path to area F, based on the above information, it chooses path A-B-C-F over other paths because of its smallest cost, which is 14. However, the optimal routing between A and F, based on all the cost information shown in FIG. 7, is A-B-D-E-D-C-F, which costs only 10. Controller A is not able to choose this path because the information exchanged between controllers is not enough for such selection. Therefore, for an optimal routing solution, the OSPF messages exchanged between controllers need to convey more information about the internal-link cost, as is discussed further herein below.

OSPF with Abstracted Intra-Area Path Costs

The embodiments of the present invention provide a method and system for avoiding the disadvantages of the prior art. The prior art and the simple implementations of OSPF in an split-architecture network as set forth above provide sub-optimal routing solutions where the shortest path isn't always accurately determined and/or an excessive amount of information is provided to identify routes that is inefficient or doesn't scale.

The embodiments of the invention overcome these disadvantages of the prior art. The embodiments of the present invention abstract the intra-area path costs between each pair of border switches as a direct link associated with a cost value. This solution provides optimal paths, can be efficiently executed, is scalable and is backward compatible with conventional routers in non-split-architectures.

In one embodiment, the OSPF routing protocol is implemented between the controllers in the split architecture to establish optimal (shortest) paths between any two forwarding elements in the network. The embodiment exposes necessary information of both the intra-area path cost and the inter-area link cost to the entire multi-area split architecture network. As mentioned above, the embodiments provide optimality, efficiency, scalability and backward compatibility.

The routing protocol provides sufficient and accurate information that allows each split-architecture controller to individually compute the optimal path to reach any other destination. This is the optimality property that traditional intra-domain routing protocol (OSPF, IS-IS) provides in traditional networks. However, the definition of optimal path changes slightly for use in split-architecture networks. In the traditional network, it is the path with minimum inter-router costs. In the split-architecture network context, the optimal path is the path with minimum inter-router cost plus intra-router cost (or intra SA-area cost).

The embodiments of the split-architecture OSPF (SA-OSPF) routing protocol allow each router to compute the shortest path decision independently. OSPF converges at a fast speed. In other words, the split-architecture OSPF protocol does not introduce additional convergence overhead in comparison to the traditional network OSPF. The split-architecture OSPF protocol scales to a large network with hundreds of switches. The scalability can be quantified by both the overhead of the number of messages exchanged and the storage requirement on the controllers. Incremental deployment is critical for the adoption of any new proposals on network protocols. The split-architecture OSPF protocol is backward compatible with conventional routers. This property increases its potential usage in real network environment.

The embodiments of the split-architecture OSPF abstract the intra-area path cost between any pairs of border switches as a direct link associated with a cost value. There are several aspects of the split-architecture OSPF that facilitate this functionality. The intra-area cost is embedded in the form of conventional OSPF messages to ensure backward compatibility. The intra-area cost is propagated to all controllers in all areas, separately from the inter-area cost. This ensures the optimality of shortest path computation. It ensures that each controller has the complete picture of the entire network, both inter-area and intra-area. With such sufficient area, computing the shortest path can be easily done using the Dijkstra algorithm, as in the traditional OSPF.

The split-architecture OSPF is scalable in that which internal information is to be propagated to external controllers is carefully managed. One naïve approach would be to send the internal costs between any pairs of split-architecture switches. However, this would cause scalability issue. Moreover, most of this information is not useful for decision making on an external controller. The split-architecture OSPF only propagates the total aggregated cost of any pair of border split-architecture switches.

Figure 8:
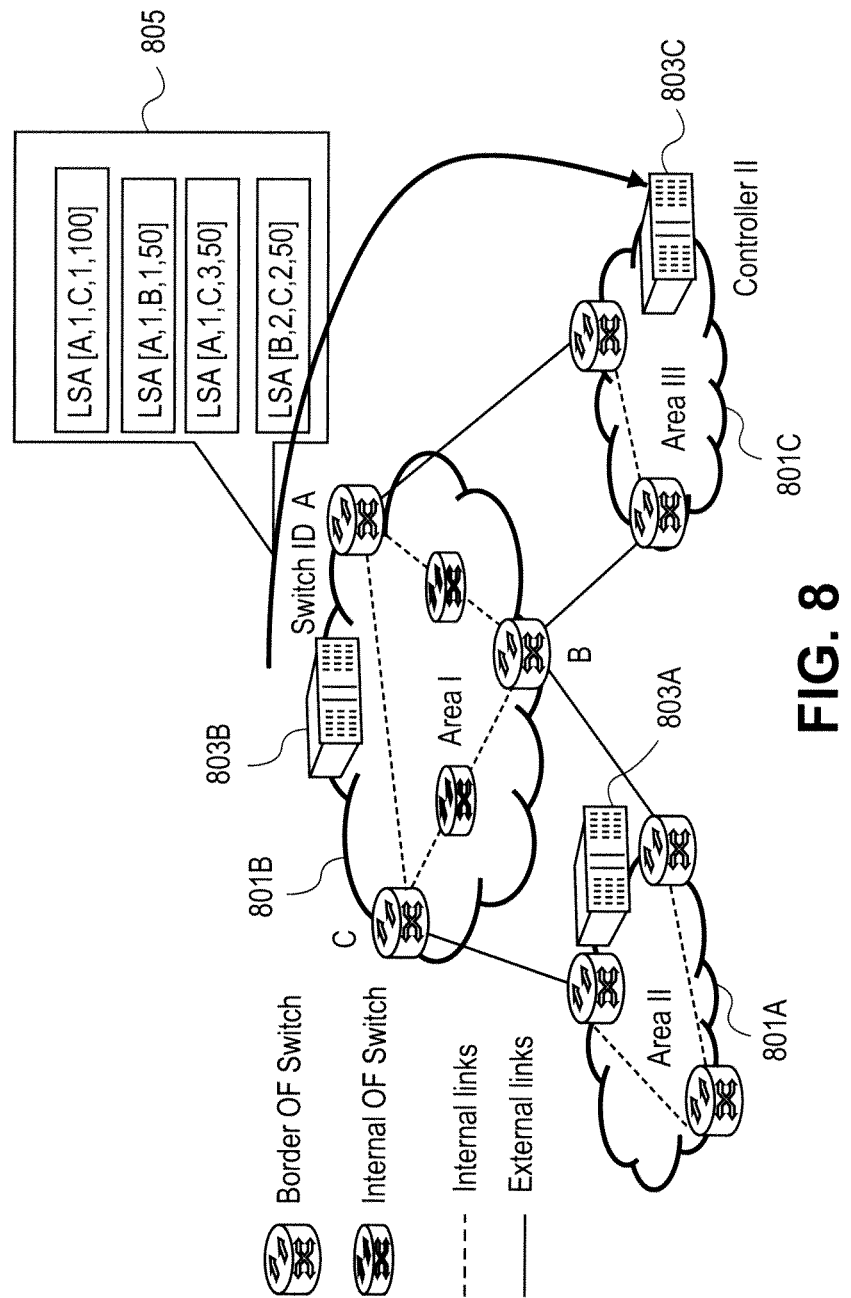
FIG. 8 a diagram of one embodiment of an example multiple area OpenFlow network with multiple controllers.

FIG. 8 is a diagram of one example embodiment of a split-architecture network. The example split-architecture network is divided into separate split-architecture areas (SAs) 801A-C. Each area 801A-C contains a set of switches. All switches in the same area are controller by a single logical controller 803A-C. In one embodiment, the SAs can be implemented as a primary controller and a set of backup controllers for redundancy purpose.

The switches in each SA can be any type of router, switch or similar networking device capable of implementing a data plane of a split architecture network. The switches can include border split-architecture switches and internal split-architecture switches. A border split-architecture switch supports split-architecture functions with an interface connecting to another switch in different SA areas. A border split-architecture switch is typically controlled by the controller of a single SA area. In other embodiments, the border split-architecture switch can be in multiple SAs and have interfaces controlled by each respective SA controller, An internal split-architecture switch supports split-architecture protocols. It is controlled by the controller in its area. All its neighbors are within the same SA area.

The switches are in communication with each other over a set of links. These links can be any type of communication medium including wired or wireless communication mediums and any combination thereof, The links can be categorized as either internal links or external links. Internal link are links between two switches within an SA area, these switches could be either border switches or internal SA area switch, which belong to the same SA area. External links are links between two SA switches belonging to different SA areas. In this case, both of the SA switches are border SA switches.

The links state advertisements (LSAs) 805 are an example set of LSAs implementing the split-architecture OSPF. Each LSA is an abstraction of a pair of border switches and the associated costs of traversing the SA area between these two border switches. These LSAs are generated by each controller and transmitted to the adjacent controllers. The example LSA set 805 is the set of LSAs for controller 803B for SA area 801B.

Figure 9:
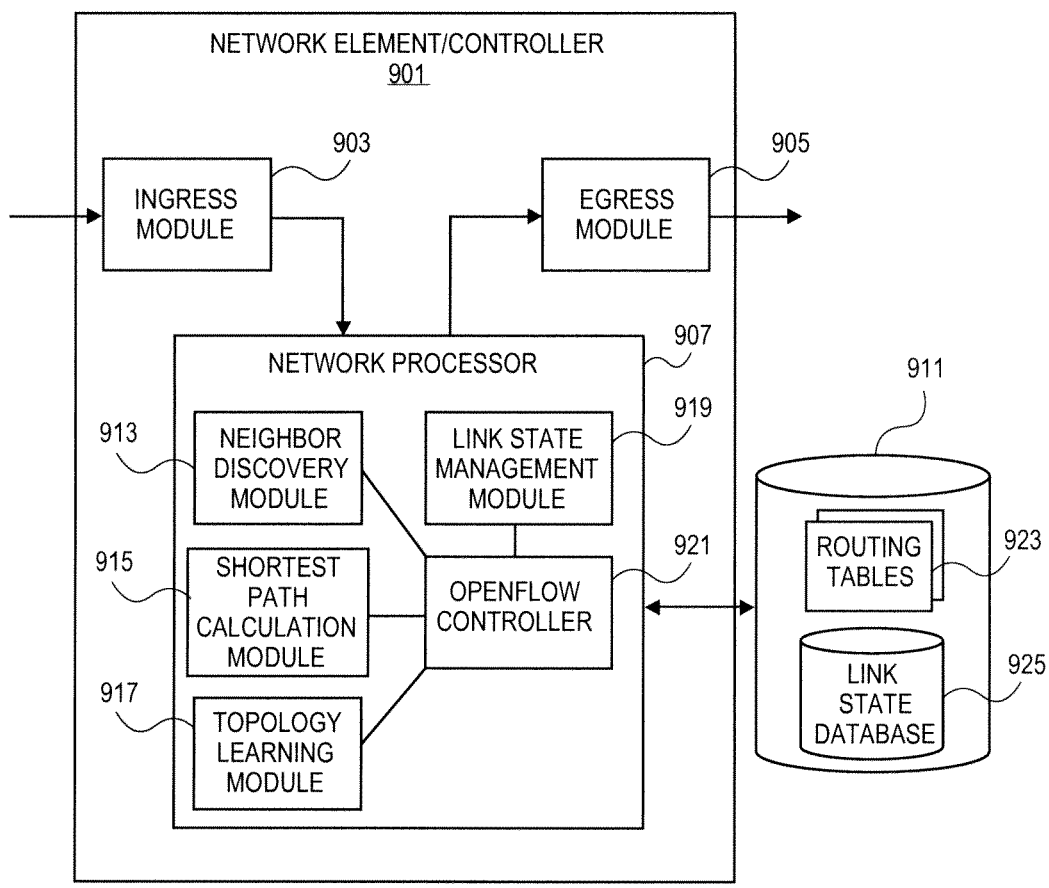
FIG. 9 is a diagram of one embodiment of a network element implementing the OSPF process.

FIG. 9 is a diagram of one embodiment of a network element implementing a controller. In one embodiment, the controller 901 is a router, switch or similar networking device. The controller 901 can include an ingress module 903, an egress module 905, a network processor 907 and a storage device 911. The ingress module 903 handles incoming data traffic at the physical and link level and provides this data to the network processor for further processing. Similarly, the egress module 905 handles outgoing data traffic at the physical and link level to transmit it to other devices over a connected network. These two module function together to enable communication with other devices over a network.

The network processor 907 is a processing device or set of processing devices that execute the functions of the network element including each of the functions related to the control plane of the network that govern the data plane of the network. The network processor 907 can execute a set of modules including a neighbor discovery module 913, a OSPF module 915, a topology learning module 917, a link state management module 919 and an a controller module such as an OpenFlow controller 921.

In addition, the network processor 907 can access data stored within the storage device 911. The data stored in the storage device 911 can include routing tables 923 and a link state database 925. In other embodiments, the storage device 911 can include any number of separate local or distributed storage devices and any arrangement of stored data across these devices. The other modules executed by the network process can also be loaded from or stored on the storage device 911.

The neighbor discovery module 913 can manage the protocols for communicating with other devices in a network using a hello protocol or similar protocol to obtain information about each of the neighboring controllers in a network to enable proper communication between and configuration of the switches of the SA area managed by the controller. Any hello protocol or process can be utilized to identify adjacent controllers and switches for the SA area.

A topology learning module 917 utilizes the information gathered by the neighbor discovery module 913 to determine a topology of the network within which the controller operates. This topology information is utilized by the OSPF module 915 to calculate optimal routes through the network. The topology information is also utilize by the link state management module 919 to track and determine link costs within the network.

The OSPF module 917 calculates optimum routes between a source or originating device to a destination device within a network. The OSPF module 917 can store the routing information in a set of routing tables 923. The OSPF module 917 can use the topology information generated by the topology learning module 917 to calculate routes between the network elements. In some embodiments, OSPF module 917 can also calculate a spanning tree for the network with the controller at the root to establish routes to each other device.

A link state management module 919 manages link state information for a network or an area of the network in a link state database 925. The link state management module 919 can also generate link state advertisements to be disseminated to adjacent controllers providing information about the connections between the controller and other controllers as well as within the SA area of a controller. This information can be packaged as a set of link state advertisements for each border switch pair that is sent to other controllers in the network.

The controller 921 can be any type of split-architecture controller to manage the control plane of the SA area. The controller can implement the OpenFlow protocol or a similar protocol for managing a split architecture network. The controller module 921 can communicate with switches in the SA area to configure the forwarding of packets on the data plane. The controller 921 also communicates with other controllers to exchange neighbor information, link state advertisements and to provide similar information to peers.

Figure 10:
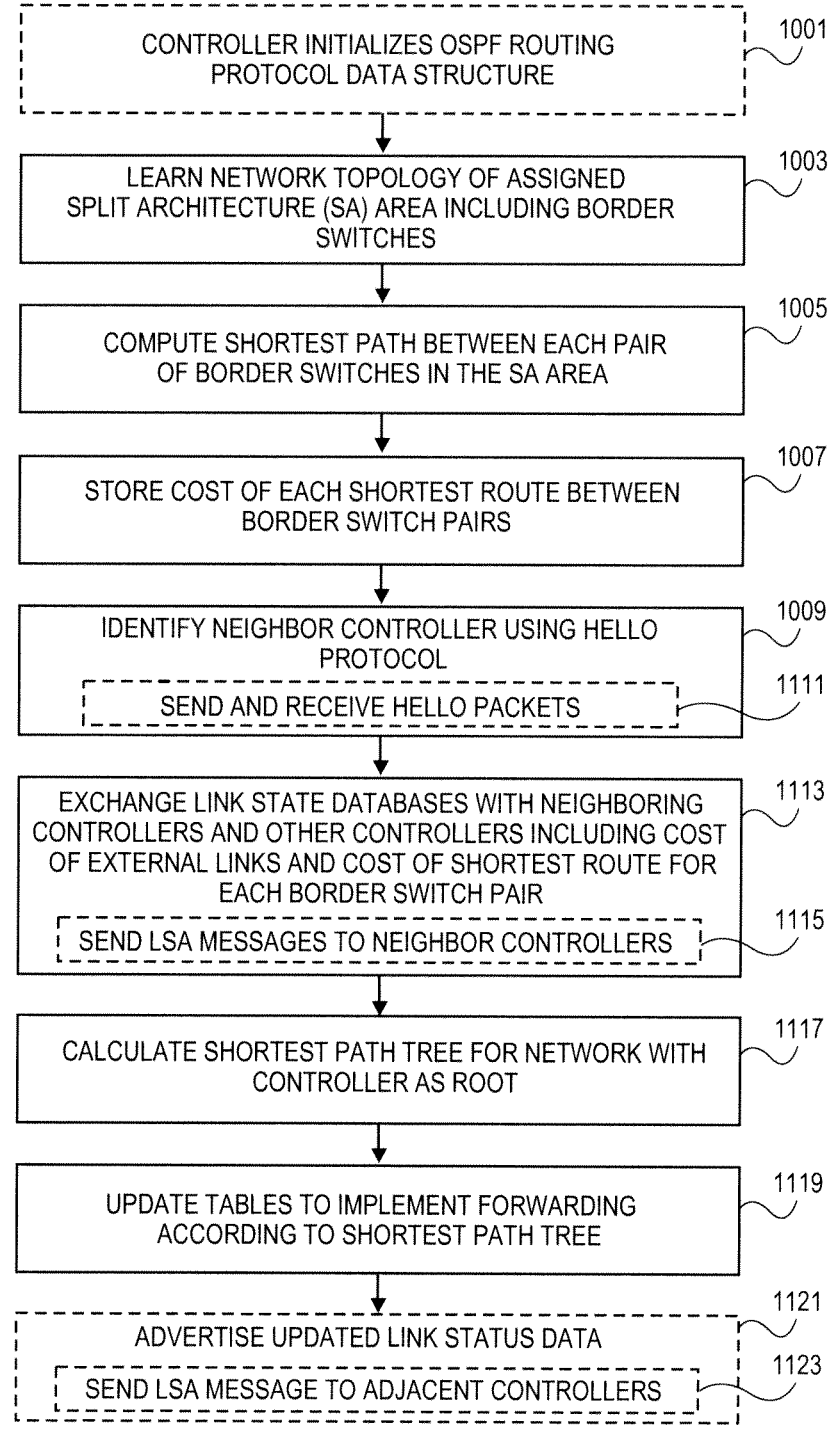
FIG. 10 is a flowchart of one embodiment of process for OSPF routing in a network with a split architecture area.

FIG. 10 is a flowchart of one embodiment of the operation of the controller to implement and support OSPF in a split-architecture network. The process is described in terms of being executed by a controller for sake of clarity, however, the process can be executed by components of the controller (e.g., an OSPF module) in conjunction with the specific controller module (e.g., an OpenFlow controller). The process can be initialized at the time that a controller is activated or reset. In other embodiments, the process is continuous or periodic. The controller can initialize a set of data structures to be utilized for storing and manipulating data such as OSPF routing protocol related data structures (Block 1001).

The controller learns the topology of its assigned SA area including identifying those switches in the SA area that are border switches (Block 1003). The topology can be learned through the exchange of link state advertisements or link state databases with other controllers and traditional routers and through similar mechanisms. Controllers in different SA areas can communicate with SA-OSPF protocol. The messages exchanged are similar to traditional OSPF Messages, including the Hello messages, Database description, Link State Request, Link State Update, and Link State Acknowledgement. In particular, in FIG. 8, a Link State Update message 805 is shown. A single Link State Update packet may contain several Link State Advertisements (LSAs). A separate copy of SA-OSPF's basic routing algorithm runs in each area. Routers having interfaces to multiple areas run multiple copies of the algorithm. This data is compiled into a topological map of the SA area and the broader network in which the SA area is situated.

The controller (e.g., the OSPF module of the controller) calculates the shortest path between each pair of border switches in the SA area of the controller (Block 1005). This can be performed in conjunction calculating other intra-area routes between switches. The border switch pair costs though are what is to be shared with other controllers and traditional routers to enable those controllers and traditional routers to determine optimum paths that cross the SA area of the controller. The shortest path is calculated using the learned topology of the SA area. In one embodiment, Dijkstra's algorithm is used to compute the shortest paths between any pairs of border switches The calculated costs of the shortest path for each pair are then stored with the topological data or with the OSPF routing data (Block 1007).

The controller then identifies neighbor controllers (Block 1009). In one embodiment, a controller can use the SA-OSPF's Hello Protocol to acquire neighbors. The controller sends Hello packets to another controller in its neighboring area or a neighboring traditional router, and in turn receives the Hello packets from other controllers and traditional routers (Block 1111). On broadcast and point-to-point networks, the controller dynamically detects controllers or traditional routers in its neighboring areas by sending its Hello packets to the multicast address. On non-broadcast networks, some configuration information can be provided to discover neighboring controllers.

Next, the controller will attempt to form adjacencies with some of its newly acquired neighboring controllers. Link-state databases are synchronized between pairs of adjacent controllers (Block 1113) by exchanging LSA messages with the adjacent controllers (Block 1115). Each LSA message contains the cost of its entire external links. The controller not only sends to a specific neighbor the cost of links connecting to this neighbor, but also the cost of links to all neighbors. In addition to sending out the cost of external links in the, the controller will also send out the cost of internal links. The LSA message can be constructed using the SA switch IDs of the two border switches, together with the two relevant interface IDs. A controller can periodically advertise the state of its SA area, which is also called link state. Link state is also advertised when an area's (a controller's) state changes. An area's adjacencies are reflected in the contents of its LSAs. This relationship between adjacencies and link state allows the protocol to detect failure and performance changes in a timely fashion.

LSAs are flooded across multiple SA areas. The flooding process is reliable, ensuring that all controllers in the entire network have exactly the same link-state database. This database consists of the collection of LSAs originated by each area including both inter-area topology and intra-area topology.

From this link state database, each controller calculates a shortest-path tree for the overall network, with itself as root (Block 1117). This shortest-path tree in turn yields a routing table for the OSPF protocol. Based on this routing information, the controller programs the switches in its SA area to route data packets through the SA area using the calculated shortest paths (Block 1119). The update of the switches can be accomplished using a control plane protocol (e.g., Open-Flow) over secure channels or using a similar process.

As changes occur in the network updated link status advertisements can be sent by the controller (Block 1121). The LSA messages are sent to adjacent controllers to notify them of changes in the SA area of the controller so that the neighboring controllers can update their routing as needed.

The split-architecture OSPF differs from traditional OSPF in that a traditional router looks like a single router to other routers in the network. However, an SA area will look like N routers to other areas/routers in the network, where N is the number of border split-architecture switches of the area. The difference is that, while the traditional OSPF runs a single process on a single router per area and looks like a single router, the SA-OSPF runs a single process on a single controller of the SA area and looks like N routers to other controllers.

In one embodiment, the single SA-OSPF process sends N different Hello packets to represent each of the N border SA switches, for every Hello packet sent by the OSPF process in a traditional router. These hello packets are sent on interfaces connected to other routers/SA areas. Similarly, a single SA-OSPF process sends N different Router-LSA packets to represent each of the N Border SA Switches, for every Router-LSA packet sent by the OSPF process in a traditional router. These LSA packets are sent on interfaces connected to other routers/SA areas.

In short, the controller for an SA area manages OSPF as if it has N OSPF controller processes, where N is the number of border split-architecture switches in the SA area. This ensures backward compatibility with OSPF running on connected traditional routers. Thus, the controller sends out N hello packets, N LSA messages and so forth. For the same number of routers in traditional networks, in split-architecture networks, SA-OSPF uses a lesser number of protocol packets compared to traditional OSPF. The savings come from not having to send OSPF protocol packets between the border SA switches belonging to the same SA area.

LSA Messages

FIG. 11 is diagram of an OSPF link state advertisement header format. To ensure that SA-OSPF is backward compatible, the same format as the standard OSPF message formats (i.e., the same sequence of fields and length of fields is utilized. However, the assignment of values to some of the fields can be different.

FIG. 12 is a diagram of an SA-OSPF LSA message, specifically, a Router-LSA type message. A router-LSA is generated by each switch in an area. It describes the state of the area's interfaces within the area. This message is originated by all controllers. This LSA describes the collected states of the router's interfaces to a multi-domain SA network. It is flooded throughout all controllers.

In one embodiment, a router-LSA message is different from the traditional router-LSA message in four fields of the message (shown in FIG. 12): Self Switch ID, Self Interface ID, Neighbor Interface ID, and Neighbor Switch ID. The Switch ID is the unique 32-bit identifier assigned to each switch in the split architecture. This ID must be unique among all switches in the multi-area SA domain. In one embodiment, the highest IP address of the switch is used as the Switch ID. The Self Switch ID is the identifier of the advertising switch, and the Neighbor Switch ID is the identifier of the neighboring switch. The Interface ID is the 32-bit identifier assigned to each interface of a switch. This identifier only needs to be unique in a single switch. The Self Interface ID is the Interface ID of the advertising switch and the Neighbor Switch ID is the Interface ID of the neighboring interface (of the neighboring switch).

Handling of HELLO Messages

OSPF Hello protocol is a mechanism that allows a router to establish and maintain the adjacency with neighboring routers. The adjacent routers exchange Hello messages. In broadcast and point-to-point networks, a router can dynamically detect its neighboring routers by sending Hello messages to a multicast address. Upon receiving Hello packets, the router form adjacencies among neighbors. Link-state databases are synchronized between pairs of adjacent routers as well as the routing updates. After the adjacent is established, a router still needs to periodically exchange Hello messages to indicate that it is alive. In summary, the purpose of the Hello message is to discover and maintain neighboring relationships.

Figure 13:
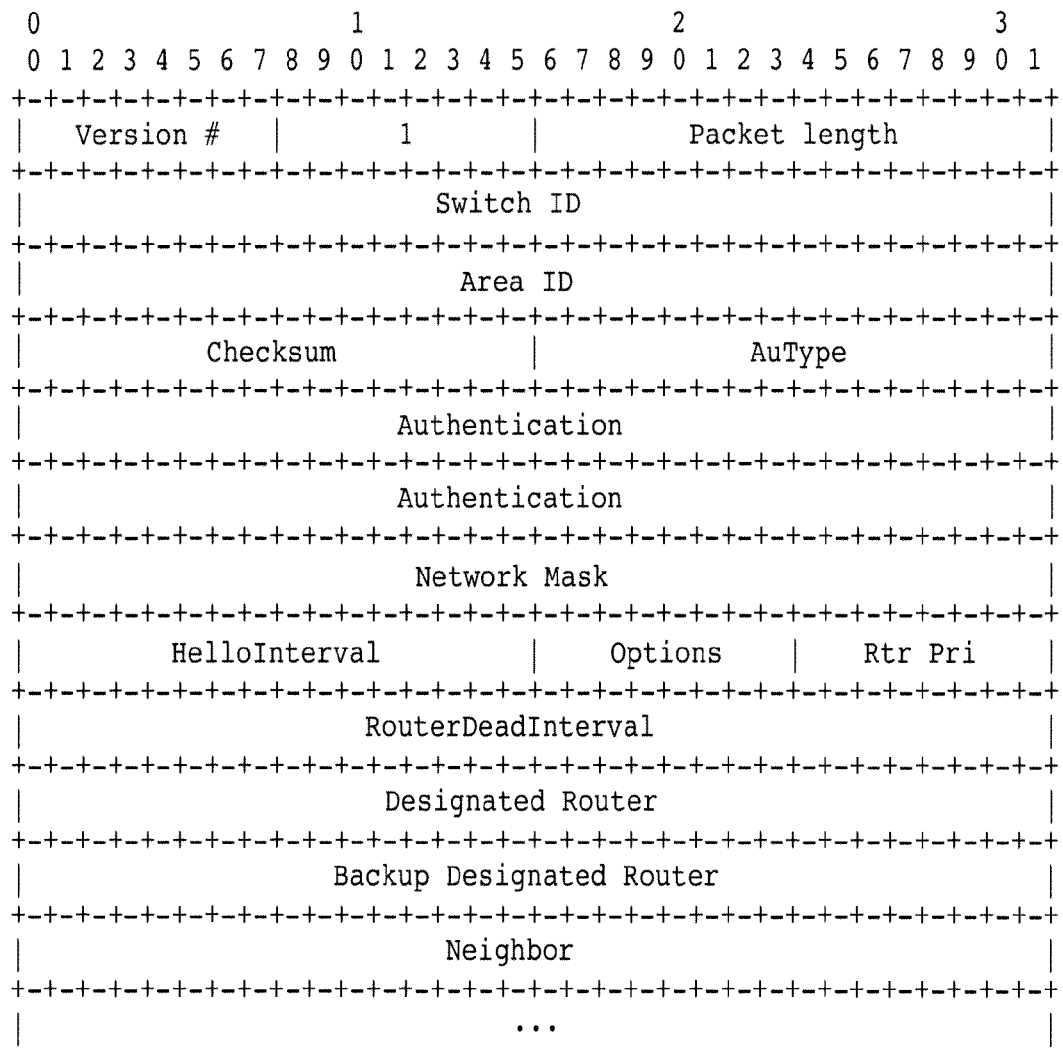
FIG. 13 is a diagram of a split architecture OSPF hello message.

FIG. 13 is a diagram of the Hello message in SA-OSPF. In the SA-OSPF protocol, the Hello message can be unchanged. However, the split-architecture controller needs to construct additional Hello messages to maintain the adjacencies between neighboring routers and the Split Architecture switch that it connects to.

Figure 14:
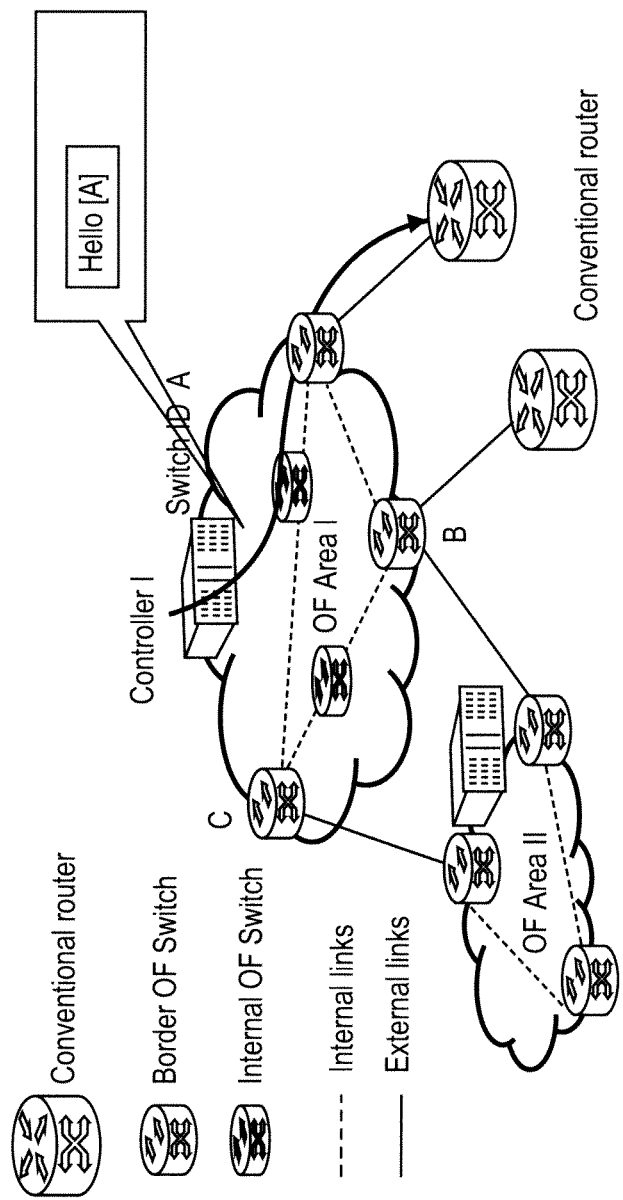
FIG. 14 is a diagram of one embodiment of a process of sending a hello message in a network from a split architecture controller to a traditional router.

FIG. 14 is a diagram of the Hello message exchanged between a split-architecture controller and a traditional conventional router. In SA-OSPF, the controller first constructs an OSPF Hello message on behalf of the border switches. It uses the border switch's highest IP address in the field of switch ID. The packet is first injected to the switch SI and then sent to the adjacent routers on the egress link.

Thus, a method, system and apparatus for implementing OSPF in a split-architecture network is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a network element functioning as one of a plurality of controllers for one of a plurality of areas of a split architecture network, the controller to provide a control plane for the area of the split architecture network where the controller is remote from a plurality of switches providing a data plane for the area of split architecture network, the controller to facilitate optimized routing across the plurality of areas of the split architecture network by providing limited intra-area link cost data to other controllers of other areas of the split architecture network and to traditional routers of a network including the split architecture network, the limited intra-area link cost data providing costs of each possible shortest path traversal of the area of the controller without providing all internal link cost data, the method comprising the steps of:
   learning a topology of the area of the controller in the split architecture network including each border switch in the area of the controller, wherein each border switch in the area of the controller has at least one external port linking the area of the controller to another area of the split architecture network or to one of the traditional routers in the network;
   computing a shortest path between each border switch pair in the area of the controller;
   storing a cost of each shortest path between each border switch pair in a routing table of the controller;
   identifying each neighbor controller in the split architecture network or neighbor traditional router in the network using a hello protocol, wherein each neighbor controller controls switches in another area of the split architecture network accessible through at least one external port of the area of the controller;
   exchanging a link state database with each neighbor controller and neighbor traditional router, the link state database including the cost of each shortest path between each border switch pair;
   calculating a shortest path tree for the network using the link state database with the controller as a root of the tree; and
   updating forwarding tables in switches of the area of the controller to implement forwarding according to the shortest path tree.

2. The method of claim 1, wherein the step of identifying each neighbor controller further comprising the steps of:
   sending a hello packet on each external port of the area of the controller; and
   receiving hello packets from each neighbor controller through at least one external port of the area of the controller.

3. The method of claim 1, wherein the step of exchanging link state data further comprises the step of sending a link state advertisement to each neighboring controller, the link state advertisement including a cost to each external link of the controller.

4. The method of claim 1, wherein the step of exchanging link state data further comprises the step of sending a link state advertisement to each neighbor controller, the link state advertisement including the cost of the shortest path for each border switch pair in the area.

5. The method of claim 1, further comprising the step of advertising updated link status data to each neighboring controller.

6. The method of claim 5, wherein the step of advertising the update link status data further comprises the step of sending a link status advertisement message with updated link status data to each neighboring controller.

7. The method of claim 1, wherein the step of updating forwarding tables further comprising the step of updating forwarding tables of each switch in the area of the controller using the OpenFlow Protocol.

8. The method of claim 1, further comprising the step of initializing Open Shortest Path First (OSPF) protocol data structures at the controller.

9. A network element functioning as one of a plurality of controllers for one of a plurality of areas of a split architecture network, the controller to provide a control plane for the area of the split architecture network where the controller is remote from a plurality of switches providing a data plane for the area of the split architecture network, the controller to facilitate optimized routing across the plurality of areas of the split architecture network by providing limited intra-area link cost data to other controllers of other areas of the split architecture network and to traditional routers of a network including the split architecture network, the limited intra-area link cost data providing costs of each possible shortest path traversal of the area of the controller without providing all internal link cost data, the network element comprising:
   an ingress module configured to receive data over a network;
   an egress module configured to transmit data over the network;
   a network processor coupled to the ingress module and egress module, the network processor configured to execute a set of modules comprising a controller module, a topology learning module, a shortest path calculation module, a neighbor discovery module and a link state management module,
      the topology learning module configured to determine a topology of the area of the controller in the split architecture network including each border switch in the area of the controller, wherein each border switch has at least one external port linking the area of the controller to another area of the network or to a traditional router in the network,
      the controller module configured to provide control plane functionality for the area of controller in the split architecture network,
      the shortest path calculation module configured to identify a shortest path between each border switch in the area of the controller to be shared with neighbor controllers and the traditional routers and to calculate a shortest path tree for the network with the controller as the root of the tree using a link state database, the neighbor discovery module configured to identify each neighbor controller and traditional routers in the network using a hello protocol, and the link state management module configured to exchange the link state database with each neighbor controller and traditional routers in the network, the link state database including a cost of each shortest route between each border switch pair in the area of the controller; and a routing table storage device communicatively coupled to the network processor, the routing table storage device configured to store routing tables for the controller module, including shortest path information for the area of the controller and between border switches of the area of the controller.

10. The network element of claim 9, wherein the neighbor discovery module is configured to send a hello packet on each external port of the area and receive hello packets from each neighbor controller through at least one external port of the area.

11. The network element of claim 9, wherein the link sate management module is further configured to send a link state advertisement to each neighboring controller, the link state advertisements including the cost to each external link of the controller.

12. The network element of claim 9, wherein the link state management module is further configured to send a link state advertisement to each neighbor controller, the link state advertisement including the cost of the shortest path for each border switch pair in the area of the controller.

13. The network element of claim 9, wherein the link state management module is further configured to advertise updated link status data to each neighboring controller.

14. The network element of claim 9, wherein the link status management module is further configured to send a link status advertisement message with updated link status data to each neighboring controller.

15. The network element of claim 9, wherein the controller module is further configured to update forwarding tables of each switch in the area of the controller using the OpenFlow Protocol.

16. The network element of claim 9, wherein the shortest path calculation module is further configured to initialize Open Shortest Path First (OSPF) protocol data structures at the controller.

* * * * *

UNITED STATES PATENT AND TRADEMARK OFFICE
CERTIFICATE OF CORRECTION

PATENT NO. : 8,559,314 B2
APPLICATION NO. : 13/208251
DATED : October 15, 2013
INVENTOR(S) : Yedavalli et al.

It is certified that error appears in the above-identified patent and that said Letters Patent is hereby corrected as shown below:

In the Specifications

In Column 4, Line 51, delete "device.)" and insert -- device) --, therefor.

In Column 9, Line 1, delete "controller, An" and insert -- controller. An --, therefor.

In Column 9, Line 8, delete "thereof, The" and insert -- thereof. The --, therefor.

In Column 10, Line 4, delete "OSPF module 917" and insert -- OSPF module 915 --, therefor.

In Column 10, Line 6, delete "OSPF module 917" and insert -- OSPF module 915 --, therefor.

In Column 10, Line 7, delete "OSPF module 917" and insert -- OSPF module 915 --, therefor.

In Column 10, Line 10, delete "OSPF module 917" and insert -- OSPF module 915 --, therefor.

In Column 13, Line 12, delete "SI" and insert -- S1 --, therefor.

Signed and Sealed this
Fifteenth Day of April, 2014

Michelle K. Lee
*Deputy Director of the United States Patent and Trademark Office*